United States Patent [19]

Borraccia et al.

[11] Patent Number: 5,152,606
[45] Date of Patent: Oct. 6, 1992

[54] MIXER IMPELLER SHAFT ATTACHMENT APPARATUS

[75] Inventors: Dominic Borraccia, Spencerport; Jeffrey S. Gambrill, Hilton; Walter C. Webster, Brockport; Jonathan C. Everdyke, Canandaigua, all of N.Y.

[73] Assignee: General Signal Corporation, Stamford, Conn.

[21] Appl. No.: 559,107

[22] Filed: Jul. 27, 1990

[51] Int. Cl.⁵ ............................ B01F 7/22; F16B 3/00
[52] U.S. Cl. .................................. 366/331; 366/270; 366/330; 366/343; 403/316; 403/318; 416/207
[58] Field of Search ............... 366/330, 270, 279, 325, 366/349, 343, 331; 416/214 R, 207, 208; 403/316, 317, 319, 318

[56] References Cited

U.S. PATENT DOCUMENTS

| | | | |
|---|---|---|---|
| 810,148 | 1/1906 | Hornby | 403/318 X |
| 938,546 | 11/1909 | Bernhard | 403/316 X |
| 1,264,230 | 4/1918 | Vierus | 403/318 |
| 2,182,240 | 12/1939 | Sinclair | 403/317 |
| 3,994,604 | 11/1976 | Visser | 403/318 X |
| 4,285,637 | 8/1981 | Thompson | 416/208 X |
| 4,290,711 | 9/1981 | Paine et al. | 403/318 X |
| 4,697,303 | 10/1987 | Matsui et al. | 403/316 X |
| 4,722,608 | 2/1988 | Salzman et al. | 366/330 |

OTHER PUBLICATIONS

"Current Design" of A-6000 Impeller mounting arrangement (sketch), date unknown.

Primary Examiner—Harvey C. Hornsby
Assistant Examiner—C. Cooley
Attorney, Agent, or Firm—Martin Lukacher; Milton E. Kleinman

[57] ABSTRACT

A mixer impeller, which is adapted to mix and blend liquids and liquid suspensions in industrial and commmercial applications and is subject to forces which tend to work the impeller loose from attachment with its driving shaft, is secured to the shaft by collars (locking rings) which are threaded on the ends of hubs from which the blades of the impeller extend. In order to secure the attachment of the collars to the hub, a locking key is inserted between the collar and the shaft. The inner periphery of the collars are tapered outwardly away from the shaft. The neck of the locking key has portions which are deflected against these tapered inner peripheries when a pin is inserted through the neck of the locking key. A ramp on the collar mates with a ramp on the key to prevent reverse rotation (working loose) of the collar. The impeller is restrained against axial movement by the collar and against rotational movement by being keyed to the shaft and restricted by the ramp on the collar. Removal of the key for impeller replacement and maintenance is readily accomplished using the ramps on the surfaces of the collars and shoulder of the key which bear against each other. Upon removal of the locking pin, the inside of the neck deflects inwardly and the key is urged out of the collar, when the collar is unscrewed from the hub.

14 Claims, 6 Drawing Sheets

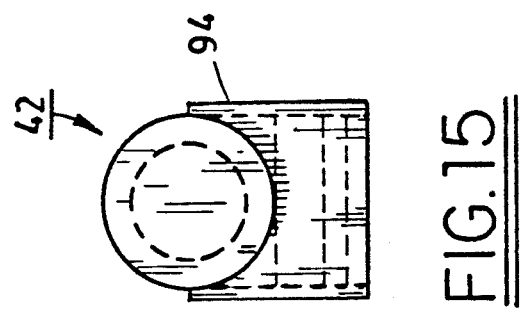
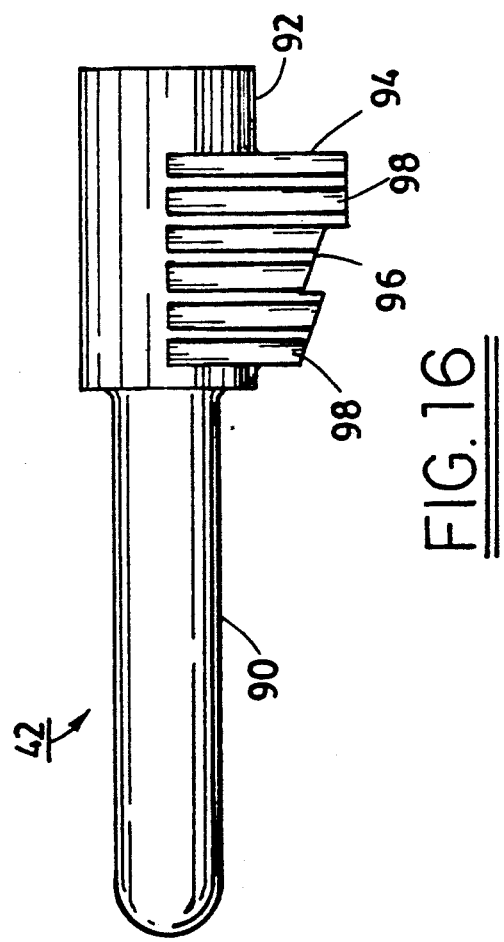

MIXER IMPELLER SHAFT ATTACHMENT APPARATUS

DESCRIPTION

The present invention relates to apparatus for securely mounting a mixing impeller on a shaft, which is adapted to drive the impeller, and particularly to an assembly including a locking key for securing the impeller to the shaft against working loose during mixing operations.

The present invention is especially suitable for use in attaching an impeller assembly which is fabricated from fiber reinforced plastic (FRP) to its drive shaft, and particularly an impeller having a mounting structure, including a hub which is attached to a mounting area of the shaft which has keyways therein. Such an impeller and mounting assembly is described in U.S. Pat. No. 4,722,608, issued Feb. 2, 1988 to Ronald N. Salzman and Keith T. McDermott. The mounting apparatus provided by the invention may have other applications wherever a collar attachment of a hub to a shaft is used, and it is desired to attach the collar, in spite of forces tending to work it loose.

As shown in the above referenced patent, it is feasible to attach an impeller by its hub to a shaft having keyways into which keys on the hub extend and which are held in place by collars which provide hub locking rings and are threadedly attached to the hub. As discussed in the patent, a pin may be inserted through the collar into the shaft to prevent it from working loose. The removal of such pins is difficult. It has also been proposed to utilize a locking pin with a lip which snaps over the hub locking ring. The pin requires grooves or serrations around the collar into which the locking pin must extend. It is desirable to provide an assembly for securing the collar which provides a positive lock, assuring that the collar is securely fastened to the hub and the impeller is thereby secure on the shaft to the shaft.

Accordingly, it is the principal object of the present invention to provide improved apparatus for securing the mounting of an impeller to a shaft, and particularly of an impeller assembly having a hub which is attached to a shaft by collars around the shaft which are attached to the hub.

It is another object of the present invention to provide an improved assembly for securing an impeller to a shaft having a locking device which simplifies the design and fabrication of the impeller attachment assembly and enables installation in a way which is substantially fool-proof.

It is a still further object of the invention to provide an improved attachment assembly for securing an impeller to a shaft which provides locking forces which exceed the design torques which are operative on the impeller, thereby preventing the impeller from working loose.

It is a still further object of the present invention to provide improved apparatus for mounting an impeller assembly of the type described in the above referenced patent on a shaft with minimal design modifications of the impeller assembly.

Briefly described, apparatus for mounting an impeller having a hub on a shaft which is provided in accordance with the invention, makes use of a mounting area on the shaft having a keyway which extends axially of the shaft. A collar, or hub locking ring, is attached to the hub around the shaft. The collar has an inner periphery which tapers outwardly from the shaft (a conical surface which affords an open area defined by the shaft, the hub and the collar). A key having a shoulder and a neck with inner and outer sides is used to lock the collar to the hub and to the shaft after the collar has been attached to the hub. The key and collar have complementary ramps on the shoulder of the key and on an opposing end surface of the collar which ramps are disposed transverse to the axis of rotation of the shaft. The key is disposed in locking position in the keyway in the mounting area of the shaft. The key extends between the mounting area and the inner periphery of the collar. The shoulder of the key bears upon the collar. The key is prevented from turning around the shaft because the inside of the neck is in the keyway. The neck has an opening into which a pin is driven into the neck. The inside of the neck below the shoulder is engaged by the pin and deflected outwardly into the area defined by the conical inside periphery of the collar preventing upward axial movement. The ramp on the collar and the mating ramp on the key prevent rotational movement of the collar because axial movement of the key is prevented due to the inner, conical lock. Therefore, the assembly is locked in place. In order to facilitate the removal of the impeller from the shaft, the ramp surfaces of the shoulder and the collar which bear against each other and prevent rotation are also used to facilitate removal of the key. Upon removal of the pin and rotation of the collar in a sense to remove it from the hub, the ramps apply forces in a direction to drive the key out from between the shaft and the collar. Collars are provided on opposite ends of the hub and are locked in place with the key and pin assemblies.

The foregoing and other objects, features and advantages of the invention, as well as a presently preferred embodiment thereof, will become more apparent from a reading of the following description in connection with the accompanying drawings in which:

FIGS. 3A to 6A are sectional views taken along the lines 3A—3A through 6A—6A of FIGS. 3 through 6;

FIG. 15 is a top view of the locking pin; and

FIG. 16 is a front view of the locking pin.

Figure 1:
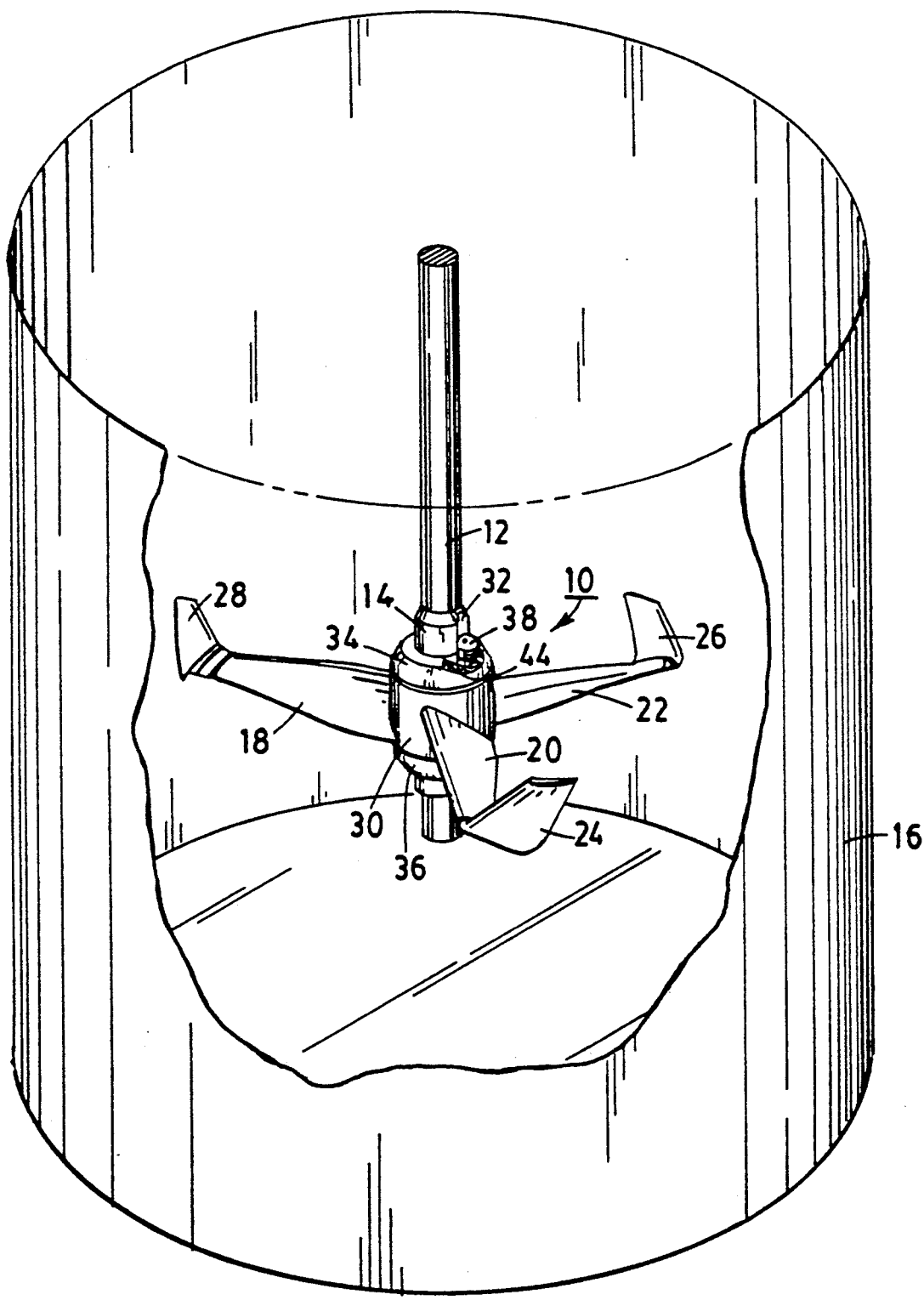
FIG. 1 is a perspective view of a tank broken away to illustrate an impeller and its mounting assembly, which includes mounting apparatus in accordance with the invention.

Referring more particularly to FIG. 1 of the drawings, there is shown a mixing impeller 10 mounted on a drive shaft 12 and particularly on a mounting area 14 thereof. The drive shaft is connected to an electric motor via a gear box. The impeller 10 is shown in a conventional environment in a tank 16 which contains a liquid or liquid suspension to be mixed or blended. The impeller 10 is of the design shown in the above referenced Salzman and McDermott patent. It has three blades 18, 20 and 22. The blades have proplets 24, 26 and 28. The blades are mounted on a hub 30. The hub is held in place on the mounting area by keys which project into keyways in the mounting area. One of these keyways 32 extends axially of the shaft and is shown in FIG. 1.

The hubs are secured to the shaft by collars or hub locking rings 34 and 36 on the upper and lower ends thereof. These locking rings are threaded onto the hub ends. The locking rings are secured by an attachment or locking mechanism (assembly) 38, provided by a key 40 and a pin 42 best shown in FIG. 2 and the other figures of the drawing. FIG. 1 also shows a ramp 44 in the surface of the collar which cooperates with the key 40 to prevent upward axial movement when the locking mechanisms 38 are in place. This ramp also facilitates removal of the key when the pin 42 has been removed and collar is turned to release it from the hub. There are two locking mechanisms, one used to lock the upper collar 34 and the other (not shown in FIG. 1) to lock the lower collar 36.

Figure 2:
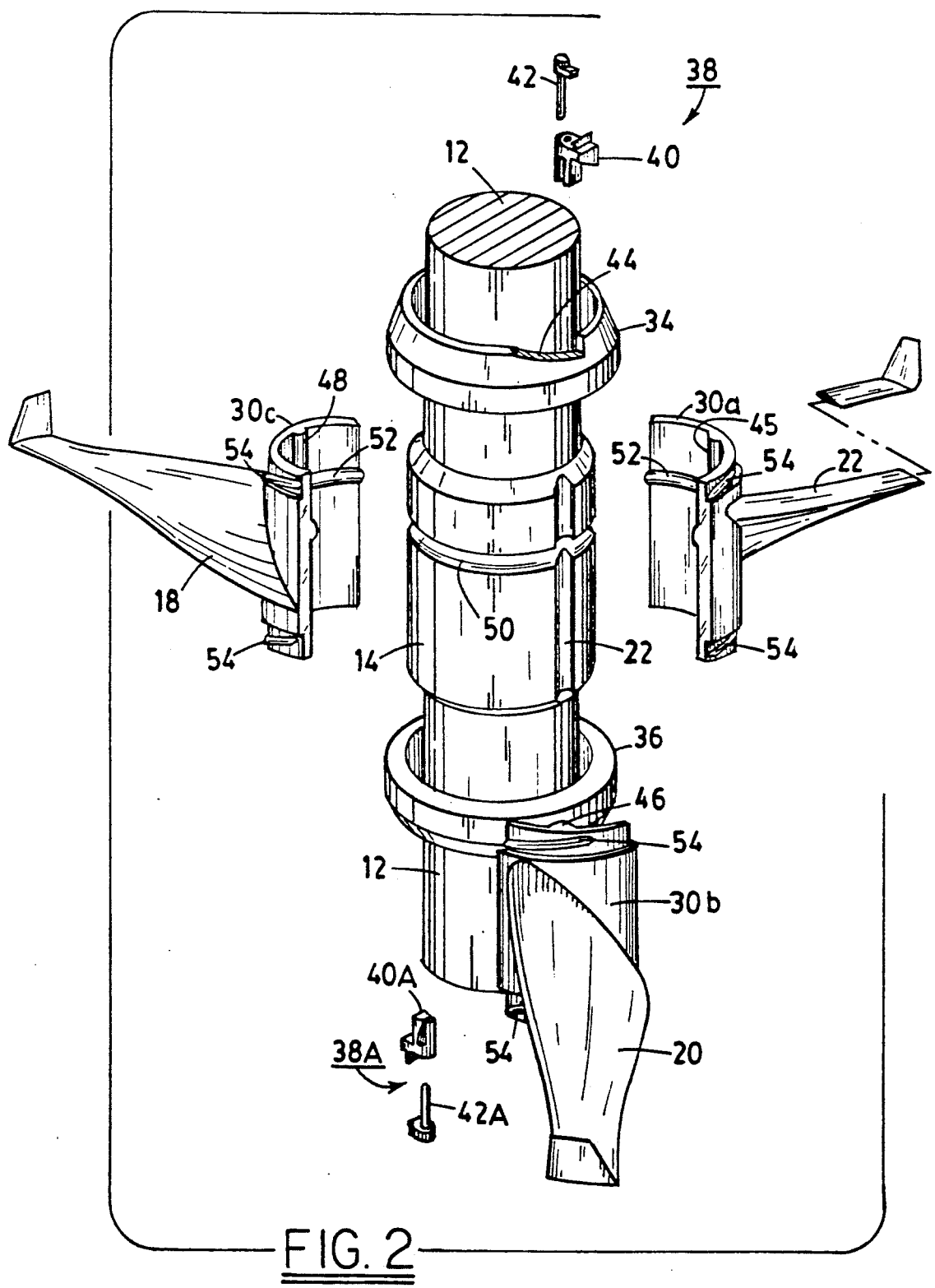
FIG. 2 is an exploded view of the impeller assembly shown in FIG. 1.
Figure 3:
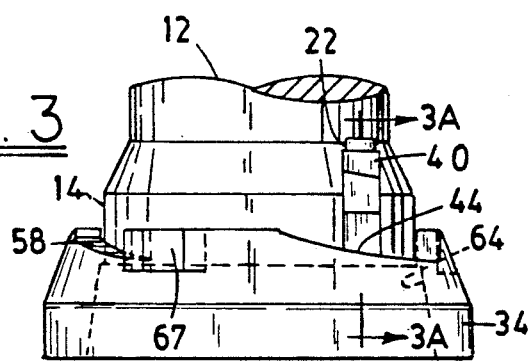
FIGS. 3 to 6 are fragmentary elevational views illustrating the installation of a locking key and pin assembly in accordance with the invention.
Figure 3A:
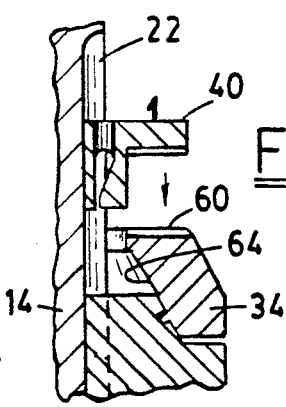
Figure 4:
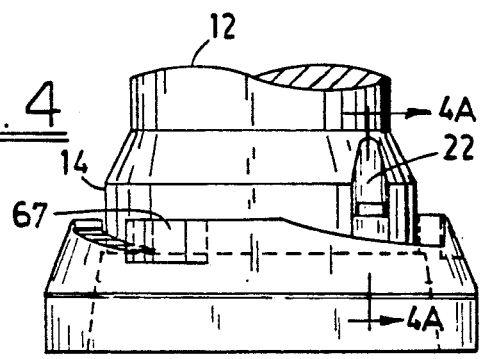
Figure 4A:
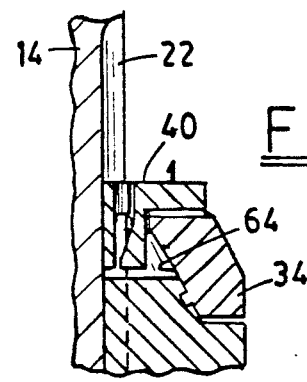
Figure 5:
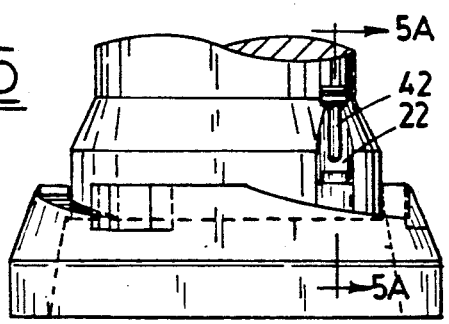
Figure 5A:
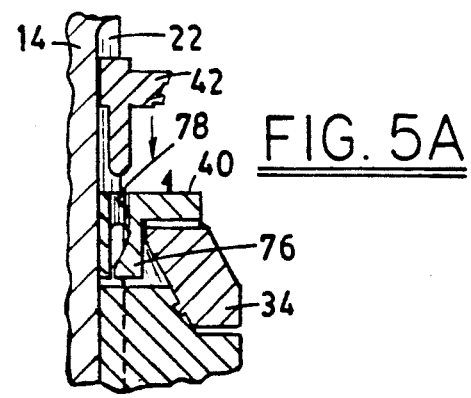
Figure 6:
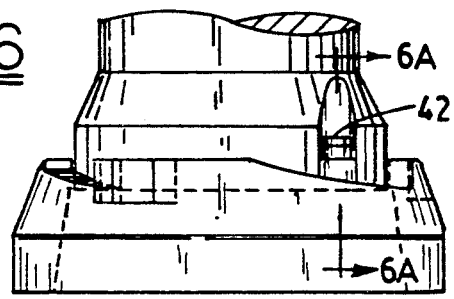
Figure 6A:
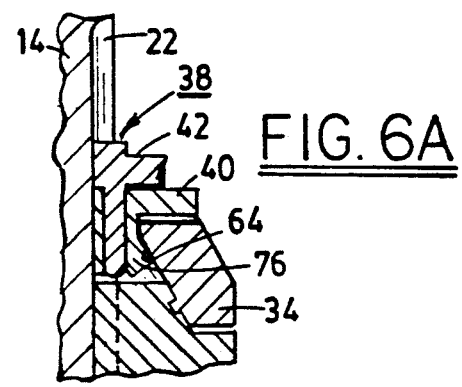

Referring to FIG. 2, the design of the blades 18, 20 and 22 and of sections 30A, 30B and 30C of the hub, which provide the impeller assembly, is shown. This design and the manner in which the blades are fabricated is described in detail in the Salzman and McDermott patent. The mounting area 14 has three circumferentially spaced axial keyways 22, which transfer torque to the blades via keys 45, 46 and 48 on the hub, and a keyway 50, circling the mounting area 14, which carries the thrust forces on the impeller. A circumferential key 52, which engages the keyway 50, is formed in part in each of the hub sections 30A to 30C. The keys and keyways define a cruciform key and keyway arrangement. The operation thereof in transferring thrust and torque forces with respect to the impeller is described in detail in the Salzman and McDermott patent.

The ends of the hub have internal threads (grooves) which receive external threads on the inner peripheries of the collars 34 and 36 when the impeller is mounted on the mounting area 14.

Figure 7:
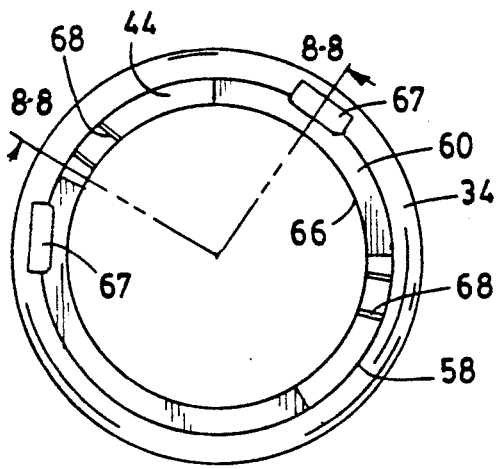
FIG. 7 is a plan view of one of the collars or hub locking rings illustrated in the previous figures.
Figure 10:
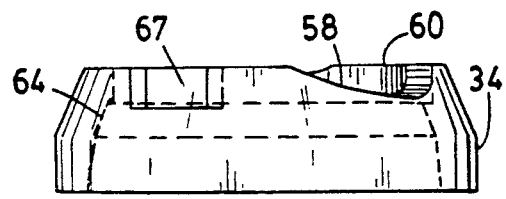
FIG. 10 is an elevational view of the collar shown in FIGS. 7 and 8.
Figure 8:
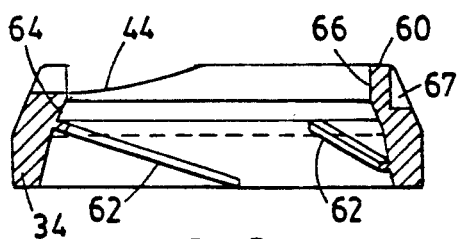
FIG. 8 is a sectional view taken along the lines 8—8 in FIG. 7.

One of the ramps 44 is shown in the collar 34. There is another ramp approximately diametrically opposite to the ramp 44. This other ramp is a ramp 58 best shown in FIG. 7. At least two locking mechanism assemblies 38 and 38A are used. One is inserted between the shaft mounting area and the inner periphery of the upper collar 34. The other is inserted between the shaft mounting area and the lower collar 36. Both locking mechanisms 38 and 38A are located in the area of the ramps 44 or 58. Only one locking mechanism per collar can be used. This is a feature which makes installation and assembly more fool-proof, since there is a tendency for workers to install as many spare locking mechanisms (keys and pins) as they have in their possession.

The design of the collars is shown in FIGS. 7 through 10 in greater detail. It will be appreciated that the upper and lower collars 34 and 36 are identical, so that only the collar 34 need be described. The collars have end surfaces 60 which are formed with the pair of ramps 44 and 58. The inner peripheral surfaces of the collar has ribs 62 which form the internal threads. The inner periphery is tapered outwardly from the shaft, as shown at 64, to define a conical area below a cylindrical surface 66 of the inner periphery. This conical area receives a portion of the key when the key is disposed in locking position as will be described in greater detail hereinafter.

There are marks 68 in the ramp of the collar. These marks provide fiducial lines. They are positioned in alignment with the axial keyways 22 when the collars are tightened sufficiently to hold them securely on the ends of the hub 30. These marks aid the workers installing the impeller assembly and indicate when the hub are tightened sufficiently, thereby reducing the possibility that the hubs will be over torqued and strained. The marks 68 thus contribute to the fool-proof assembly operations.

Figure 13:
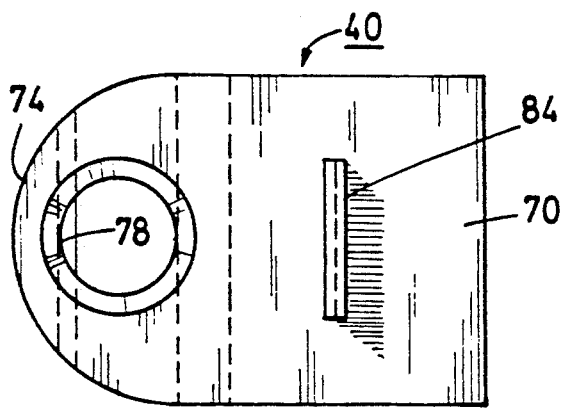
FIG. 13 is a plan view of the locking key.
Figure 14:
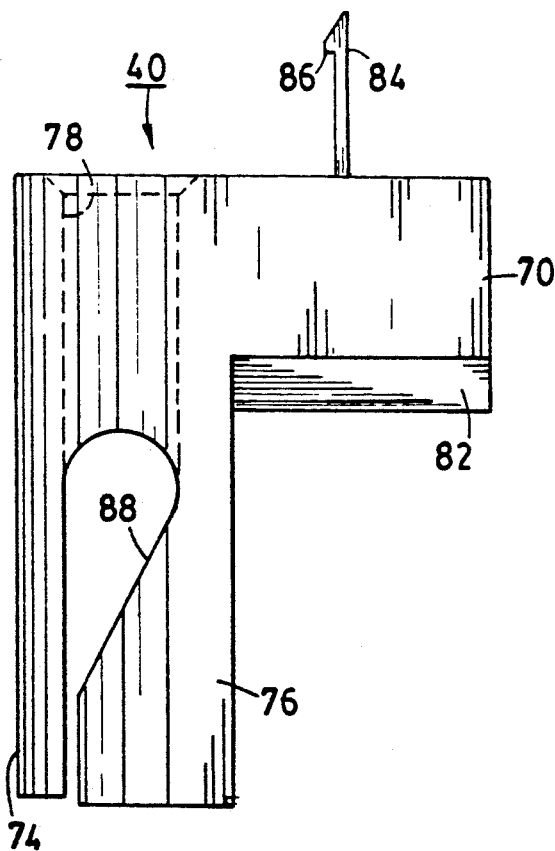
FIG. 14 is an elevational view of the locking key.
Figure 12:
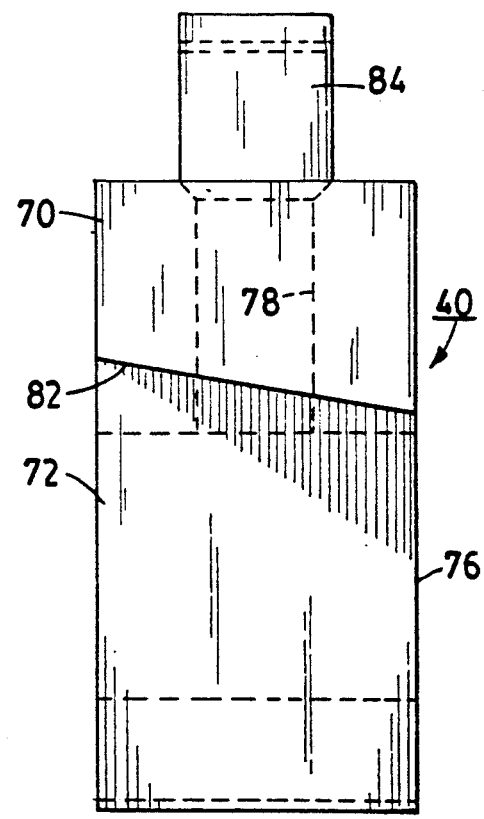
FIG. 12 is a front view of the locking key.

A typical key 40 is shown in FIGS. 12 to 14. The key is L-shaped and has a shoulder 70 and a neck 72. The neck has an inner side 74 which enters the keyway 22. The neck also has an outer side or leg 76 which is spaced from the inner side, but is separated therefrom by a distance less than the width of the pin 42. The width of the pin is approximately equal to the width of a hole 78 into which the pin is inserted. In other words, the inside of the outer leg 76 of the neck 72 has a taper 88 which is engaged by the pin, and when so engaged, causes the outer side or leg 76 to deflect. The key is preferably made of plastic material of sufficient flexibility to allow the outer leg 76 to deflect when the pin is inserted.

The underside surface 82 of the shoulder 70 bears upon the collar. This underside surface has a ramp shape which is inclined at an angle complimentary to the angle of inclination of the ramps 44 and 58. In other words, the angle which the ramp surface 82 of the shoulder 70 makes with respect to a plane perpendicular to the drive shaft 12, and the angles the ramps 44 and 58 make with this plane are approximately equal. The ramps slide over each other when the collars are unscrewed; the threads 62 and the ramps 44 and 58 being inclined in opposite (up and down) directions (See FIG. 8)(and the pins 42 are removed to enable the outer legs 76 to deflect back). This provides an axial force tending to drive the key 40 out of the area between the collar and the mounting area of the shaft where it had been disposed in locking position. In the locking position this axial force is resisted by the internal 90° step and conical surface of the collar thereby locking the key in place.

A detent tab 84, having a latch 86 at its upper end, is molded integrally with the key. This detent serves to catch the pin 42 and inhibits its movement out of the key 40, when the pin 42 is disposed in locking position inside the key. A feature of the detent 84 is that it is sufficiently thin so that it is easily broken with proper tools to allow pin removal. This tells the workers who install the mixing impellers to use a new key when reassembling or replacing the impeller on the shaft mounting area 14.

A suitable plastic material for the key 40 is a fluropolymer, such as sold under the trade name Kynar by the Pennwalt Company.

The pin 42 is shown in FIGS. 15 and 16. It also may be made of plastic material. It has been found that a polyphenylene sulfide polymer is suitable. Such a material is sold under the trade name Ryton by the Phillips Petroleum Company. The pin has a cylindrical section 90 and a cap 92. The cap is of larger diameter than the cylindrical pin section 90. The cap has a catch 94 extending therefrom. The catch has a groove 96 which receives the latch 86 of the detent 84 when the pin 42 is in locking position.

The projecting portion or catch 94 of the cap 92 may be formed with a plurality of ribs 98 which facilitate grabbing the pin with a tool, such as pliers to extract the pin from the key 40 by withdrawing it from the hole 78 and from out between the inner and outer side legs 74 and 76 of the key 40.

Figure 11:
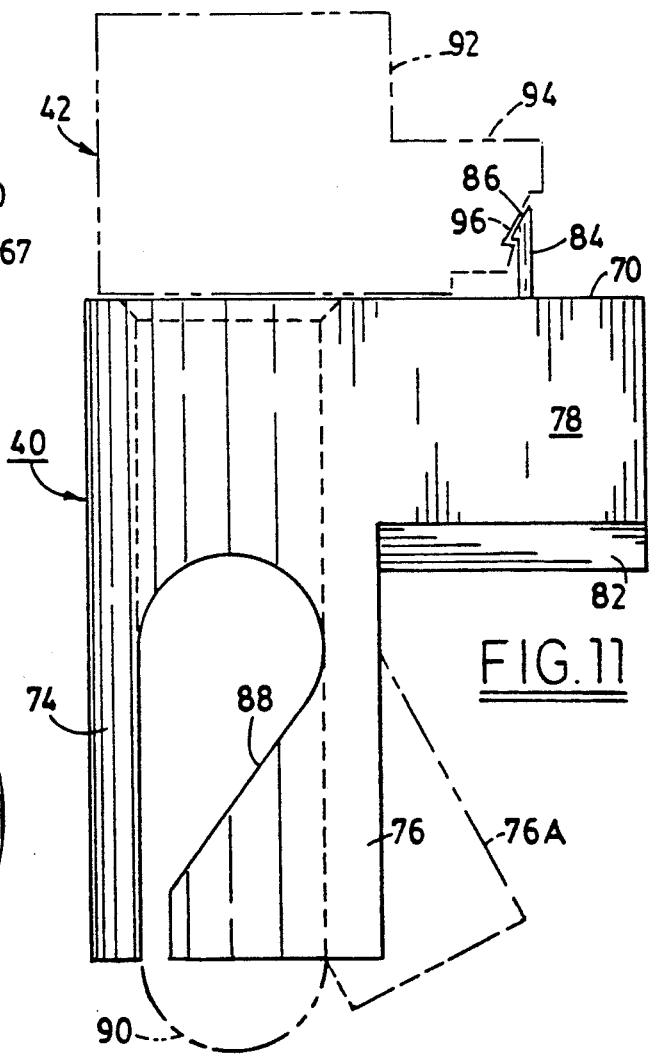
FIG. 11 is a schematic view of the locking key illustrating the deflection of its expandable neck portion.
Figure 9:
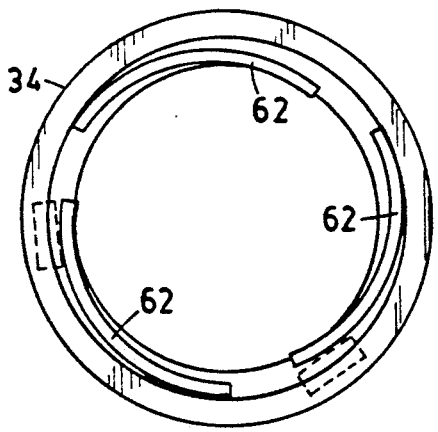
FIG. 9 is a bottom view of the collar shown in FIGS. 7 and 8.

Referring to FIG. 11 it will be seen that the pin 42 is inserted into the neck of the key 40, until its cap 92 seats against the upper surface of the shoulder 70. Then the detent 84 latches into the groove 96 of the catch 94. As the pin 42 is pressed into the key, the rounded point of the, pin engages the tapered surface 88 of the outer side or leg 76 and deflects or expands it outwardly to the position shown at 76A in FIG. 11 plastically deforming the face 72 of the key leg 76 until stopping against the conical surface 64 of the collar. Then the key is clamped between the upper surface 60 of the collar and the conically tapered surface 64 of the collar s inner periphery. Since the key is then located in the axial keyway 22, the collar cannot turn and the key cannot move axially. There are also frictional forces between the key and the collar and the keyway which tends to hold the key 40 in place. The pin is held in place by friction, as well as by the detent 84.

FIGS. 3-3A, 4-4A, 5-5A and 6-6A show the sequence of steps in the assembly of the locking mechanism 38 into one of the collars 34. The sequence is the same in installing the other locking mechanism on the lower collar 36. The sequence is reversed on disassembly. Initially the collar 34 is screwed down onto the hub. There are notches 67 which are adapted to receive a spanner for turning the collar, both in screwing it into the hub 30 and in the removal of the collar from the hub.

The key 40 is first placed in the keyway 22, and pushed down so that the ramp lower surfaces 82 of the shoulder of the key 40 bears against the upper surface 60 of the collar in the ramp regions 44 or 58. The ramp region 44 is used in FIGS. 3 through 6.

After the keys are seated, the pin 42 is indexed against the axial keyway and brought down into the hole 78 in the neck region of the key. As the pin is moved downwardly, the outer side leg 76 is deflected. When the pin is fully seated with its cap on the upper surface of the shoulder 40, the outer side leg 76 of the key is deformed into the step 13. The leg 76 then bears against the tapered conical portion of the inner periphery of the collar 34. Then the locking mechanism 38 is disposed in locking position with the key clamped in place to prevent the collar 34 from working loose during operation of the mixing impeller in mixing or blending liquids and liquid suspensions in the tank 16 (FIG. 1).

From the foregoing description, it will be apparent that there has been provided improved apparatus for mounting a mixing impeller which positively secures the mixing impeller and prevents it from working loose from the shaft which drives the impeller. Variations and modifications of the herein described apparatus, within the scope of the invention, will undoubtedly suggest themselves to those skilled in the art. Accordingly, the foregoing description should be taken as a illustrative and not in a limiting sense.

What is claimed is:

1. Apparatus for mounting on the shaft having an axis of rotation, an impeller having a hub, said shaft having a mounting area, said area having a keyway which extends axially of said shaft and a turnable collar having an inner periphery and being removably attachable to said hub around said shaft, said apparatus comprising a tapered portion on the inner periphery of said collar which tapers outwardly from said shaft when said collar is attached to said shaft, a key having a shoulder and a neck with inner and outer sides, said outer side being deflectable away from said inner side, said key being disposed in locking position between said mounting area and the inner periphery of said collar with said shoulder bearing upon said collar and with said inner side of said keyway when said collar is attached to said hub, a pin having a surface defining its width, said pin being movable into said key into locking position in said neck between said inner and outer sides, said inner and outer sides each having a portion, said portions of said inner and outer sides facing each other, said portions of said inner and outer sides also being normally spaced from each other by a distance less than the width of said pin, said outer side being engaged by said surface of said pin and being deflected against said inner periphery of said collar and said tapered portion thereof when said pin is in locking position, said collar having a surface against which said shoulder of said key bears, said surface of said collar defining a ramp extending circumferentially along said surface of said collar, said shoulder of said key having a surface which bears upon said ramp when said key is in the locking position, said ramp of said collar and said surface of said shoulder having complementary inclinations which are disposed in mating relationship when said key is in said locking position, and said ramp on said collar applying force against said shoulder of said key to move said key out of said locking position when said collar is turned to release said collar from said shaft.

2. The apparatus according to claim 1 wherein said ramp defines a first angle with respect to a plane perpendicular to the axis of said shaft, and said surface of said shoulder defines a second angle with respect to said plane, said first and second angles being approximately the same.

3. The apparatus according to claim 2 wherein said hub has said inner side of said key disposed in said keyway of said mounting area.

4. The apparatus according to claim 2 wherein said surface of said collar against which said surface of said key bears has a pair of ramps spaced circumferentially from each other about said collar and inclined in the same direction to said plane.

5. The apparatus according to claim 1 wherein said collar and hub have threads attaching them in assembled relationship, said threads being inclined in a sense opposite to said ramp on said collar.

6. The apparatus according to claim 1 wherein said key has a hole extending downwardly into said neck into which said pin is inserted and moved downwardly, said portion of said outer side having a tapered surface spaced from said portion of said inner side, said tapered surface extending in a direction across said hole, said tapered surface being engagable with said pin when said pin is inserted into said hole and moved downwardly along said neck into said locking position to deflect the outer side of said neck against said tapered inner periphery of said collar.

7. The apparatus according to claim 1 wherein said pin has a cap, a detent extending from said shoulder of said key, and a catch member extending from said cap and engagable with said detent when said pin is moved into said locking position.

8. The apparatus according to claim 7 wherein said detent is a thin, flexibly body of material which breaks away from said key when said pin is withdrawn from said key in order to remove said key from collar.

9. The apparatus according to claim 1 wherein said pin has a cap disposed in said keyway when said pin is received in said key.

10. The apparatus according to claim 1 wherein said hub has opposite ends axially spaced along said shaft, said collar being disposed on one of said ends, and the apparatus further comprising a second collar around said shaft and attachable to said hub at the other of said ends, said second collar also having an inner periphery tapered away from said shaft, a second key disposed in said keyway between said second collar and said mounting area, said second key having a shoulder extending away from said shaft and bearing upon said second collar, said second key having a neck with inner and outer sides, a second pin having a surface defining its width and movable in a direction opposite to said first pin into said second key between said inner and outer sides thereof, said inner and outer sides of said second key being spaced apart a distance less than the width of said second pin, said outer side of said second key being deflected by said second pin against said inner periphery of said second collar when said second pin is in locking position.

11. The apparatus according to claim 10 wherein said collars have surfaces on which said shoulders of said keys bear, said surfaces having ramps, said shoulders having surfaces which engage said ramps, said surfaces of said shoulders and said ramps having complimentary inclinations in directions to apply force on said keys to move said keys axially away from said collars when said collars are turned in a sense to remove them from attachment with said hubs which force is resisted when said sides are deflected and said pins are in locking position.

12. The apparatus according to claim 1 wherein said key is composed of plastic material of sufficient resiliency to permit said outer side of said neck to be deflected by said pin against said inner periphery of said collar.

13. The apparatus according to claim 12 wherein said pin is composed of plastic material.

14. The apparatus according to claim 13 wherein said key material is a fluropolymer and said pin material is a polyphenylene sulfide polymer.

* * * * *